US012059066B2

(12) United States Patent
Greiner-Perth

(10) Patent No.: US 12,059,066 B2
(45) Date of Patent: Aug. 13, 2024

(54) MASSAGE APPLICATOR

(71) Applicant: Aptar Radolfzell GmbH, Radolfzell (DE)

(72) Inventor: Jürgen Greiner-Perth, Gottmadingen (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 65 days.

(21) Appl. No.: 17/996,106

(22) PCT Filed: May 3, 2021

(86) PCT No.: PCT/EP2021/061587
§ 371 (c)(1),
(2) Date: Oct. 13, 2022

(87) PCT Pub. No.: WO2021/228607
PCT Pub. Date: Nov. 18, 2021

(65) Prior Publication Data

US 2023/0200514 A1 Jun. 29, 2023

(30) Foreign Application Priority Data

May 13, 2020 (EP) .................................... 20174489

(51) Int. Cl.
*B43M 11/06* (2006.01)
*A45D 34/04* (2006.01)
*A61H 7/00* (2006.01)

(52) U.S. Cl.
CPC ........... *A45D 34/04* (2013.01); *A45D 34/042* (2013.01); *A61H 7/005* (2013.01)

(58) Field of Classification Search
CPC ....... A45D 34/04; A45D 34/042; A61H 7/005
(Continued)

(56) References Cited

U.S. PATENT DOCUMENTS 8,177,450 B2 * 5/2012 Zhang .................... A45D 34/04 401/265
2011/0091265 A1 4/2011 Zhang
2018/0085282 A1 * 3/2018 Liu ........................ A61H 23/02

FOREIGN PATENT DOCUMENTS

CN 207312183 U 5/2018
DE 102013214227 A1 1/2015
(Continued)

OTHER PUBLICATIONS

International Search Report, with English translation, issued in corresponding International Application No. PCT/EP2021/061587, date of mailing Oct. 7, 2021 (11 pages).
(Continued)

*Primary Examiner* — Jennifer C Chiang
(74) *Attorney, Agent, or Firm* — FLYNN THIEL, P.C.

(57) ABSTRACT

A massage applicator for massaging cream-type fluids into the skin, provided with an end wall with a massage region, on which massage elevations are provided. The end wall is penetrated by at least one outlet channel for the cream-type fluid. The massage applicator is provided with suitable markings in the massage region for measuring the fluid to be used, the applicator is provided with a cover which can be blocked in an open position and/or secured in a closed position, and an assembly of two valves is used in order to secure against unintentional discharge.

18 Claims, 6 Drawing Sheets

(58) Field of Classification Search
USPC .......................................................... 401/183
See application file for complete search history.

(56) References Cited

FOREIGN PATENT DOCUMENTS

| | | | | | |
|---|---|---|---|---|---|
| DE | 102018204939 | A1 | | 10/2019 | |
| EP | 2327632 | A1 | | 6/2011 | |
| EP | 2511189 | A1 | | 10/2012 | |
| FR | 2905359 | A1 | | 3/2008 | |
| KR | 20130137331 | A | * | 12/2013 | |
| KR | 20210016729 | A | * | 2/2021 | |
| WO | 2012/104162 | A1 | | 8/2012 | |
| WO | WO2019185307 | A1 | * | 10/2019 | ............. A45D 34/04 |
| WO | WO-2020015932 | A1 | * | 1/2020 | ............. A45D 34/04 |
| WO | WO-2020159079 | A1 | * | 8/2020 | |

OTHER PUBLICATIONS

Written Opinion of International Searching Authority, issued in corresponding International Application No. PCT/EP2021/061587, date of mailing Oct. 7, 2021 (20 pages).

* cited by examiner

MASSAGE APPLICATOR

AREA OF APPLICATION AND PRIOR ART

The invention relates to a massage applicator for massaging in cream-type fluids into the skin, and to a massage dispenser having such a massage applicator.

A massage applicator of the type in question has an end wall with a massage region, on which massage elevations are provided. The end wall is penetrated by at least one outlet channel for the cream-type fluid.

The use of such a massage applicator as part of a massage dispenser takes place in such a way that fluid is conveyed by a user from a fluid reservoir onto the massage region and the latter is then pressed onto the skin area on which the fluid is to be used up or introduced. The fluid is massaged in by massaging, for example circular, movement of the massage applicator on the skin.

Commercially available massage applicators and massage dispensers with such massage applicators still have disadvantages, particularly with regard to meterability of the fluid, ease of handling and security against unauthorized discharge by children or against unintentional discharge by excess pressure in the fluid reservoir.

PROBLEM AND SOLUTION

The problem addressed by the invention is that of further developing a massage applicator of the type in question in such a way that, with low production costs, it affords advantages over known massage applicators in respect of the meterability of the fluid, in respect of ease of handling and in respect of security against unauthorized discharge by children or against unintentional discharge by excess pressure in the fluid reservoir.

According to the invention, a massage applicator of the type in question for massaging in cream-type fluids, which is designed according to the aspects described below, is proposed for this purpose. Like massage applicators of the type in question, massage applicators according to the invention have an end wall with a massage region, on which massage elevations are provided. The end wall is penetrated by at least one and preferably precisely one outlet channel for the cream-type fluid, so that fluid can pass outward from a fluid reservoir through the outlet channel and initially collects on the massage region. The massage region is preferably round and particularly preferably has a diameter of between 20 mm and 60 mm. Once the desired quantity of the cream-type fluid has been discharged onto the massage region, it is then possible to start application by pressing the massage region onto the skin area to be treated, and here, by, for example, circular movement of the massage applicator, the fluid is distributed and/or introduced into the skin by means of the massage elevations.

According to a first aspect of the invention, it is proposed that markings designed as elevations and/or depressions are provided on the massage region, said markings surrounding the at least one outlet channel and indicating different discharge quantities which are respectively achieved when the fluid discharged through the outlet channel reaches the respective marking on the massage region.

In the case of a massage applicator according to the invention of this type, it is accordingly envisaged that markings are provided on the massage region itself, that is to say the surface surrounding the discharge channel, which markings permit detection of the quantity of fluid already discharged when fluid is discharged onto the massage region. If fluid is discharged by the user, it collects in the massage region. By virtue of the markings according to the invention, the outer edge of the fluid collected on the massage region can serve as an indicator of the quantity discharged. In this case, the markings can be applied, in particular, according to the type of fluid. Since low-viscosity fluids tend to form a thin film, the thickness of which does not depend on the quantity of fluid, the quantity of fluid discharged is approximately the square of the diameter of the accumulated fluid discharged. Viscous fluids, on the other hand, form a thicker layer which becomes thicker the more fluid is discharged. In this case, the quantity of fluid discharged is approximately the cube of the diameter of the fluid discharged.

In the simplest case, a marking according to the invention could be formed by a scale extending radially outward from the discharge channel.

Preferably, however, the markings are provided as circular markings surrounding the at least one outlet channel, in particular as a raised annular structure, which is particularly preferably closed circumferentially or at most has short apertures. Such annular structures have the advantage that the fluid is thereby initially held up, with the result that first of all an inner ring is filled almost completely before the fluid overflows it and then largely fills the next ring. It has been found that this makes it easy for the user to estimate the quantity of fluid discharged.

A particularly simple configuration is possible in which only one marking, in particular a circular marking, is provided, with the result that only a defined quantity of fluid can be deliberately metered. This is expedient particularly when, owing to the type involved, the fluid is always to be discharged in the same quantity. However, configurations are preferred in which at least two markings, particularly preferably at least three markings, are provided which are suitable for metering two or three different fluid quantities.

In principle, it is conceivable for the markings to be designed as elevations and, as such, then also to be used as massage elevations, that is to say also to be responsible for the fluid being massaged into the skin. Thus, it is even conceivable to dispense with any other massage elevations in the massage region. However, it is advantageous if both the mentioned markings for indicating different discharge quantities and additional massage elevations not provided as such markings are provided on the massage region. The massage elevations not serving as markings are preferably provided as small discrete elevations, which can, in particular, be circular. Their outer contour preferably has an extent or diameter of between 1 and 5 mm. A configuration in which no such additional pure massage elevations are provided within the markings is particularly preferred. These are preferably provided exclusively, but at least partially, outside the outermost marking. In this case, they are preferably distributed in a circumferential annular region.

In order to determine the meaning of the markings and, in particular, the respectively assigned quantity of fluid, appropriate inscriptions are preferably provided on the massage dispenser, in particular on the massage applicator. In particular, such an inscription can be a volume specification. As an alternative, however, other indicative inscriptions can be provided, such as “children”, “adolescents” and “adults”. By means of the inscription, the technical function of the markings is immediately recognizable to the user. One possibility for applying the inscription consists in providing each of the markings themselves with an inscription on the massage region indicating the quantity of fluid discharged when the fluid on the massage surface reaches the marking.

In order not to impair the distribution of the discharged fluid on the massage region by the inscription, the inscriptions are preferably applied as a print in this case.

An alternative embodiment envisages that an inscription is provided at some other location of the massage applicator or on a fluid reservoir connected to the massage applicator, in particular on the inner side of a lid, which inscription indicates what quantity of fluid has been discharged when the fluid reaches the respective markings on the massage surface. By virtue of this arrangement, it is possible, in particular, for the inscription to be formed directly by the shaping of the massage applicator, thus eliminating a printing process. Arrangement on the inner side of the lid, which is preferably designed as a hinged lid, is of particular advantage since, after the lid has been swung open, this inner side can be kept in view simultaneously with the markings and the emerging fluid in the massage region. Furthermore, it has proven to be particularly intuitive if the inscription spaced apart from the massage region likewise shows the markings, supplemented by the respective volume data of the discharged fluid.

It is regarded as particularly advantageous if at least three markings, in particular in the form of concentric circles, with respective inscriptions are provided. It is regarded as particularly advantageous here if the discharge quantity difference, which can be determined from the inscription, between the two outermost markings is greater than a discharge quantity difference between the two innermost markings. Since, depending on the fluid and its viscosity, the quantity of fluid increases with an exponent between 2 and 3 with the diameter of the respective markings, it would be necessary, in the case of identical discharge quantity differences, for the respective circular markings to be positioned increasingly closer to one another toward the outside, making inscription between the markings more difficult. Increasing discharge quantity differences, for example with three markings, whose inscriptions are 0.5 ml, 1.0 ml and 2.0 ml, are therefore more suitable in practice.

According to a second aspect of the invention, it is envisaged that the massage applicator has a base, on which the end wall with the massage region and the outlet channel is provided, and has a hinged lid, which is designed to be pivotable, by means of a hinge provided at the side of the massage region, between a closed state, in which the hinged lid covers the massage region, and an opened state, in which it exposes the massage region. The hinge is preferably designed as a film hinge.

Such a hinged lid has the advantages specific to a hinged lid, in particular being captive and being intuitive to handle. For the purpose of use on a massage dispenser, such a hinged lid according to the second aspect of the invention is designed in such a way that it remains in a swung-open state. This is of particular importance in the case of a massage dispenser of the type in question since in this case the massage region is pressed onto the skin, possibly quite forcefully, and accidental pressing on of the lid and its partially sharp edges during this process could be painful. It is likewise advantageous with regard to the abovementioned inscription on the lid and its readability if the lid remains in the swung-open state.

In order to hold the hinged lid in the swung-open state, the second aspect of the invention envisages the provision of at least one latching edge on the hinged lid and on the base, which latching edges are arranged in such a way that, when the hinged lid is opened, they come into contact with one another and, when an opening movement is continued, snap together or jam together, with the result that the hinged lid is locked in the opened state. These latching edges are preferably provided in the region of the hinge, but differ from the latter in that contact between the latching edges only takes place as the lid is swung open. In the region of at least one of the two latching edges, the continued movement leads to a deformation, by means of which the hinged lid is then held in the open position.

This open position should be selected in such a way that the hinged lid and, in particular, its side facing away from the hinge does not normally come into contact with the skin when massaging in the fluid.

This is determined, on the one hand, by the position of the hinge relative to the massage region with respect to the longitudinal axis of the massage dispenser, wherein, in particular, provision is preferably made for the hinged lid, in the manner to be described below, to have a locking element which lies opposite the hinge and, with respect to the longitudinal axis, to be closer to the massage region than the hinge, thus making it possible to achieve a shape of the lateral surface which tapers in the direction of the locking element and which reduces the risk of contact between the lid and the skin.

However, the risk of the hinged lid coming into contact with the skin also depends on how far the hinged lid is pivoted between the closed and the opened state. Arrangement of the latching edges in such a way that the corresponding angle is 180° (+/−15°) is particularly advantageous if an inscription according to the first aspect of the invention is provided on the inner side of the lid.

An alternative configuration envisages that a more complex hinge device is provided instead of a simple hinge. This has at least two connecting bridges between the base and the hinged lid, wherein a first connecting bridge is articulated in such a way that it can be pivoted about different bending axes on the side of the base and on the side of the hinged lid. This means that this first connecting bridge can be moved about two bending axes, one on the side of the base and the other on the side of the hinged lid. Two such connecting bridges of the first type are preferably provided. The second connecting bridge is of a different type and has at least one bending axis, which, however, is not arranged coaxially or symmetrically with respect to either of the bending axes of the first connecting bridge. The second connecting bridge preferably has only the one aforementioned bending axis. Particularly preferably, the second connecting bridge is formed solely by a hinge, in particular a film hinge, which is arranged in a stationary manner both with respect to the base and with respect to the hinged lid, and in this way connects the hinged lid and the base virtually directly to one another. In this case, the base is guided very accurately with respect to the base, which is advantageous particularly with regard to the implementation of the child safety device which will be described below.

The different arrangement of the bending axes on the two connecting bridges has the result that, depending on its opening angle, the hinged lid is subjected to force in the direction of the closed state and/or a pivoted end position. In a central position between the closed state and the intended swung-open end position, the arrangement of the connecting bridges accordingly ensures that the hinged lid is pressed into at least one end position. In the case of a “bistable” configuration, the hinged lid is preferably pressed in the direction of the closed position or in the direction of the pivoted end position, depending on its opening angle.

This behavior is achieved by virtue of the fact that the first connecting bridge is subject to elastic elongation in a central position between the closed state and the pivoted end position, owing to the different arrangement of the bending axes with respect to the second connecting bridge.

To prevent this elongation from causing wear in the case of frequent use or use at high temperatures, in particular from causing plastic and therefore permanent elongation, provision is made for the first connecting bridge to have a bent shape which permits elastic elongation of the first connecting bridge by at least 10%, in particular by at least 20%, without plastic deformation of the first connecting bridge. This configuration is based on the recognition that a bending deformation suitable for achieving a given elongation exhibits a lower tendency to lead to plastic deformation of the connecting bridge. The avoidance of plastic deformation is significant since such plastic deformation of the first connecting bridge, in particular plastic strain, leads to the hinged lid no longer holding reliably in its pivoted swung-open position and thus increases the risk of contact between the hinged lid and the skin during application. Precisely because of the pivoting angle of the hinged lid, which will be described below, of preferably more than 150° and in particular approximately 180°, the measure described is advantageous since such a large pivoting angle also involves a relatively large maximum distance between the bending axes of the first connecting bridge and thus a large elongation.

Depending on the material, an elongation of 10% by pure stretching instead of by bending, as described, would already be critical. In the case of the preferred material PP, stretching by 10% already leads to a partially plastic deformation.

A bent shape is understood to mean a shape of the connecting bridge or of a part thereof which, for the purpose of elongation of the connecting bridge, is partially compressed and partially stretched in relation to the cross section of the bridge, while, in the case of stretching of the connecting bridge, the latter is stretched over the entire cross section. In particular, the bent shape can be formed by a curved section of the connecting bridge, the inner surface of which, in the opened state of the hinged lid, has a radius of at least 0.3 mm and preferably of at least 0.8 mm, particularly preferably of at least 1.0 mm, which temporarily undergoes an enlargement during elongation. If the radius is not uniform over the width of the connecting bridge, the data refer to the smallest, usually inner, radius in each case.

In principle, however, a bent shape can be formed by a bridge without curved sections but with inherently flat partial sections which are angled with respect to one another and thus permit elongation.

A preferred configuration of the bent shape with curved sections or with flat partial sections angled with respect to one another envisages that at least one end of the first connecting bridge, preferably both ends, makes or make a transition in a connecting region, starting from a bend in the connecting bridge, in an aligned manner into a lateral wall of the base and/or of the hinged lid, wherein mechanical decoupling is preferably produced by at least one lateral release cut in the connecting region between the connecting bridge and sections of the lateral wall which are offset in the circumferential direction. The preferably two release cuts preferably extend over a length of at least 0.5 mm, particularly preferably over a length of 1.0 mm, wherein the length of the release cut is the length over which there is a cut into the lateral surface underneath a lower side of the connecting bridge.

Here, the preferably two bends simultaneously form the bending axes of the first connecting bridge. As in the case of other bent shapes, the inner radius of these bends in the swung-open state is preferably at least 1 mm.

A likewise advantageous variant provides for the connecting bridge as a whole or virtually as a whole (>60%) to have a bent shape, in particular with a bent shape which is open at the top in the swung-open state and with the massage region facing upward, which furthermore particularly preferably has a radius on the inner side of at least 2 mm.

With a view to avoiding skin contact, provision is preferably made for the hinged lid to be pivotable through at least 150°, preferably through at least 180°, particularly preferably through at least 210°, between the closed state and the opened state, and for the latching edges to be designed for fixing at the corresponding opening angle, or for the connecting bridges to be configured to achieve this opening angle.

According to a third aspect of the invention, it is envisaged, as with the second aspect of the invention, that the massage applicator has a base, on which the end wall with the outlet channel is provided, and has a hinged lid, which is designed to be pivotable, by means of a hinge provided at the side of the massage region, between a closed state, in which the hinged lid covers the massage region, and an opened state, in which it exposes the massage region.

Furthermore, according to this third aspect of the invention, it is envisaged that a child safety mechanism is provided for fixing the hinged lid in the closed state, wherein the child safety mechanism has locking elements which are provided on the base and on the hinged lid and are in engagement with one another, in particular in an interlocking manner, in a locking position and prevent the hinged lid from being swung open. The child safety mechanism prevents small children from being able to open the lid and get at the fluid. Particularly in the case of pharmaceutically active creams, it is important to prevent this.

For release, the child safety mechanism has at least two release surfaces for manual actuation, which are spaced apart from one another and are operatively connected to one of the locking elements in such a way that the application of force to both release surfaces takes place simultaneously with a displacement of the locking elements relative to one another, thereby enabling the hinged lid to be swung open.

The two release surfaces, which are preferably provided on a lateral surface of the hinged lid, must be pressed simultaneously and preferably toward one another. As a result, the locking element on the lid is displaced and, in particular, displaced radially outward, in particular by an oval deformation of the lateral surface of the hinged lid, with the result that the abovementioned engagement with the other locking element is disabled. In principle, it is also possible to provide the release surfaces on the base. However, this can result in a larger overall size. Moreover, depending on the thickness or stability of the end face, release surfaces on the base may be too easy to deform, and therefore even the strength of a child may be sufficient for this purpose.

The force which must be applied to the release surfaces can be influenced by adaptations to the locking elements. The required force which must be applied to the opposite surfaces is preferably between 10 newtons and 100 newtons. By providing supporting structures, for example supporting ribs, on the lateral surface of the hinged lid and/or on a lateral surface of the base which faces it on the inside, it is additionally possible to achieve a reduction in the size of the release surface, i.e. pressing leads to the desired result only in a small area.

As already illustrated for the second aspect of the invention, it is also advantageous with regard to childproofing if the hinged lid has a lateral surface on which the locking element of the hinged lid and the hinge are provided opposite one another, the hinge being spaced apart from the massage region by at least 5 mm, preferably by at least 8 mm and particularly preferably by at least 10 mm, relative to a central axis of the massage applicator. In this case, the plane of the massage region is formed by its highest elevation. The comparatively large distance is helpful because it increases the distance of the hinged lid from the massage region in the swung-open state, thus ensuring that the risk of skin contact is low.

Relative to a central axis of the massage applicator, the locking element and the hinge are preferably arranged offset with respect to one another in such a way that the locking element is closer to the massage region than the hinge. This makes it possible for the lateral surface between the locking element and the hinge to have a shape which widens from the locking element to the hinge. This widening shape offers enough space for the release buttons but, at the same time, allows an advantageous position of the locking element during use and uncomplicated opening and closing of the lid after release.

Provision is preferably made for the hinged lid and the base each to have a lateral surface, wherein these lateral surfaces are designed to be in alignment with one another, at least in a partial region. In this way, an approximately cylindrical basic shape of the massage applicator can be achieved in the closed state. With such a configuration, depressions are preferably provided in the lateral surface of the base adjacent to the release surfaces on the lateral surface of the hinged lid in the closed state, in the region of which depressions the lateral surface of the base is set back or interrupted with respect to the lateral surface of the hinged lid. This makes it easier for adults to press in the release surfaces, particularly in the case of comparatively small massage applicators.

In a configuration with aligned lateral surfaces, the lateral surfaces merge in at least one partial region into outer end faces that face one another. If these outer end faces are spaced too far apart from one another, dirt can penetrate here. However, if the outer end faces rest against one another over the entire surface, this can make it more difficult to release them by pressing the release buttons, especially if cream residues have remained between them. It is therefore proposed that there remain a distance of between 0.1 mm and 0.5 mm between the outer end faces in the predominant part of the outer end faces. It has been found that such a distance reduces the risk of tilting of the hinged lid on the base when the child safety lock is actuated, the small distance counteracting the penetration of coarser dirt. As a particular preference, elevations, e.g. in the form of short, flat webs, are provided on one outer end face, in the region of which elevations, however, the outer end faces rest against one another in order to offer a reliable bearing surface despite the distance. In this way, the combination of good protection against penetrating dirt and good operability of the release surfaces is achieved.

A fourth aspect of the invention relates to the secure closure of the massage applicator of the type in question. In the manner already described, this has a base, on which the end wall with the outlet channel is provided, and has a hinged lid, which is designed to be pivotable, by means of a hinge provided at the side of the massage region, between a closed state, in which the hinged lid covers the massage region, and an opened state, in which it exposes the massage region.

According to a fourth aspect of the invention, the massage applicator has an outlet valve, which is formed by a first valve pin, arranged on the inside of the outlet channel, and an inlet into the outlet channel, and which can be opened by means of an excess pressure in a valve chamber below the end face, in that this excess pressure lifts the end wall relative to the first valve pin. During this lifting, the end wall is deformed under the effect of the excess pressure. An opposing deformation of the inner component closing off the valve chamber on the opposite side does not take place or takes place only to a relatively small extent.

When the dispenser is used, the valve is opened, in particular in that the excess pressure in the valve chamber is produced by compressing a tube which serves as a fluid reservoir. Such an outlet valve can also be provided in the configurations according to the first three aspects of the invention.

However, the said outlet valve cannot alone prevent fluid from being discharged, even when the hinged lid is closed, by excess pressure in the valve chamber, which fluid gets at least as far as the region between the hinged lid and the end wall.

To prevent this, the fourth aspect of the invention envisages providing a second valve pin or valve body, preferably on the hinged lid, in the region of the outlet channel, which second valve pin or body, together with the outlet of the outlet channel, forms a blocking valve, which is closed when the hinged lid is closed or closes at least when the end wall is lifted relative to the first valve pin by excess pressure. Depending on the configuration, such lifting can be achieved even at a slight excess pressure since it is desirable for many applications that the discharge takes place only against a very low resistance of the outlet valve.

The described configuration has the effect that, even in the event of unwanted excess pressure in the valve chamber, fluid cannot escape or can hardly escape since the displacement, required for this purpose, of the end wall in relation to surrounding parts of the base does indeed open the outlet valve, but the blocking valve simultaneously closes or has already been closed previously. The second valve pin or valve body is provided, in particular, on the inner end face of the hinged lid. The resistance which the hinged lid offers to the deflection of the second valve pin or valve body is preferably greater than the force required to displace the end wall on the side of the base.

Although it is not essential for the described mode of operation, it is advantageous if the outlet valve and the blocking valve are designed in such a way that, when the hinged lid is closed and there is no excess pressure in the valve chamber, they clamp the end wall between them. This means that when the hinged lid is closed, it is already under a preload. A deflection of the second valve pin or valve body on the hinged lid is therefore made even more difficult.

The second valve pin or valve body, which is provided on the lid, is preferably designed to be free of widening in the direction of its distal end. Thus, in particular, it can be designed to be cylindrical or tapering or to have some other shape which can seal off together with the outlet of the outlet channel without a snapping action. The background to this is that a soft material or a small wall thickness is preferred for the end wall penetrated by the outlet channel in order to allow easy opening of the outlet valve. However, such a soft or thin material would possibly be damaged by snapping in the second valve pin or valve body.

The second valve pin preferably has a shape which tapers in the direction of the outlet channel. As a particular preference, this shape is designed to be conical, at least in some section or sections. Particularly if a comparatively rigid plastic material such as polypropylene (PP) is used for the hinged lid and the second valve pin, the tapering shape is advantageous in order to facilitate entry of the valve pin into the outlet channel. Entry which is as central as possible is also promoted by the use of a film hinge which, with a suitable design, very precisely defines a movement path of the valve pin as the hinged lid is swung shut.

Particularly preferably at a distal end, the second valve pin has a cross-sectional area which is smaller than an outlet-side opening of the outlet channel. This makes it possible for the second valve pin to be able to enter the outlet channel when the hinged lid is closed in order to effect sealing within the outlet channel. With its tapering shape and preferably together with a correspondingly outwardly widening shape of the outlet channel, it can ensure good sealing.

The sealing surface provided for this purpose is preferably formed on the side of the end wall by the inner side of a raised sealing bead surrounding the outlet-side opening of the outlet channel. This sealing bead preferably has a height which corresponds at least substantially (+/−20%) to the height of the massage elevations. The sealing bead facilitates the entry of the valve pin on the lid. During use, it also acts itself in the manner of a massage elevation.

An outlet valve which opens in a pressure-dependent manner and is arranged upstream of the discharge channel is preferably also provided in the case of massage applicators which are designed in accordance with one of the first three aspects of the invention, even if the fourth aspect of the invention is not implemented. A massage applicator according to the invention preferably has several of the described aspects of the invention, particularly preferably all the described aspects of the invention.

The invention relates not only to the massage applicator itself but also to a massage dispenser for dispensing and massaging in cream-type fluids, which has a fluid reservoir for storing the cream-type fluids before discharge and a massage applicator of the type described.

The fluid reservoir is preferably designed as a squeeze bottle or a tube. The fluid to be discharged and to be massaged in, that is to say, in particular, a pharmaceutical or cosmetic fluid, is stored in the fluid reservoir before discharge.

The described parts of the massage dispenser are preferably manufactured from plastiFor the sake of simplified recycling, it is proposed that all the components of the massage dispenser are made of a uniform plastic type, in particular of polypropylene (PP). Although polypropylene is not the ideal material for tubes, the advantage of simplified recycling may compensate for this disadvantage.

The massage applicator preferably has only two components, namely an outer component, which has the described elements of the base with the massage region and, if appropriate, the hinged lid, and an inner component, which forms the valve body of the outlet valve and, together with the end wall of the base, delimits the valve chamber. The inner component preferably also has a coupling device for coupling the fluid reservoir, in particular a sleeve for snapping in the fluid reservoir or an internal thread. The inner component is preferably coupled to the outer component by a snap action. A configuration of the massage applicator in which the latter consists of only one part, which is produced in one piece, is also conceivable.

The massage dispenser preferably has the massage applicator and a fluid reservoir and thus comprises two or preferably a total of only three components. The production of the massage dispenser is comparatively favorable owing to this small number of parts.

BRIEF DESCRIPTION OF THE DRAWINGS

Further advantages and aspects of the invention will be found in the claims and the following description of preferred exemplary embodiments of the invention, which will be explained below with reference to the figures.

DETAILED DESCRIPTION OF THE EXEMPLARY EMBODIMENTS

Figure 1:
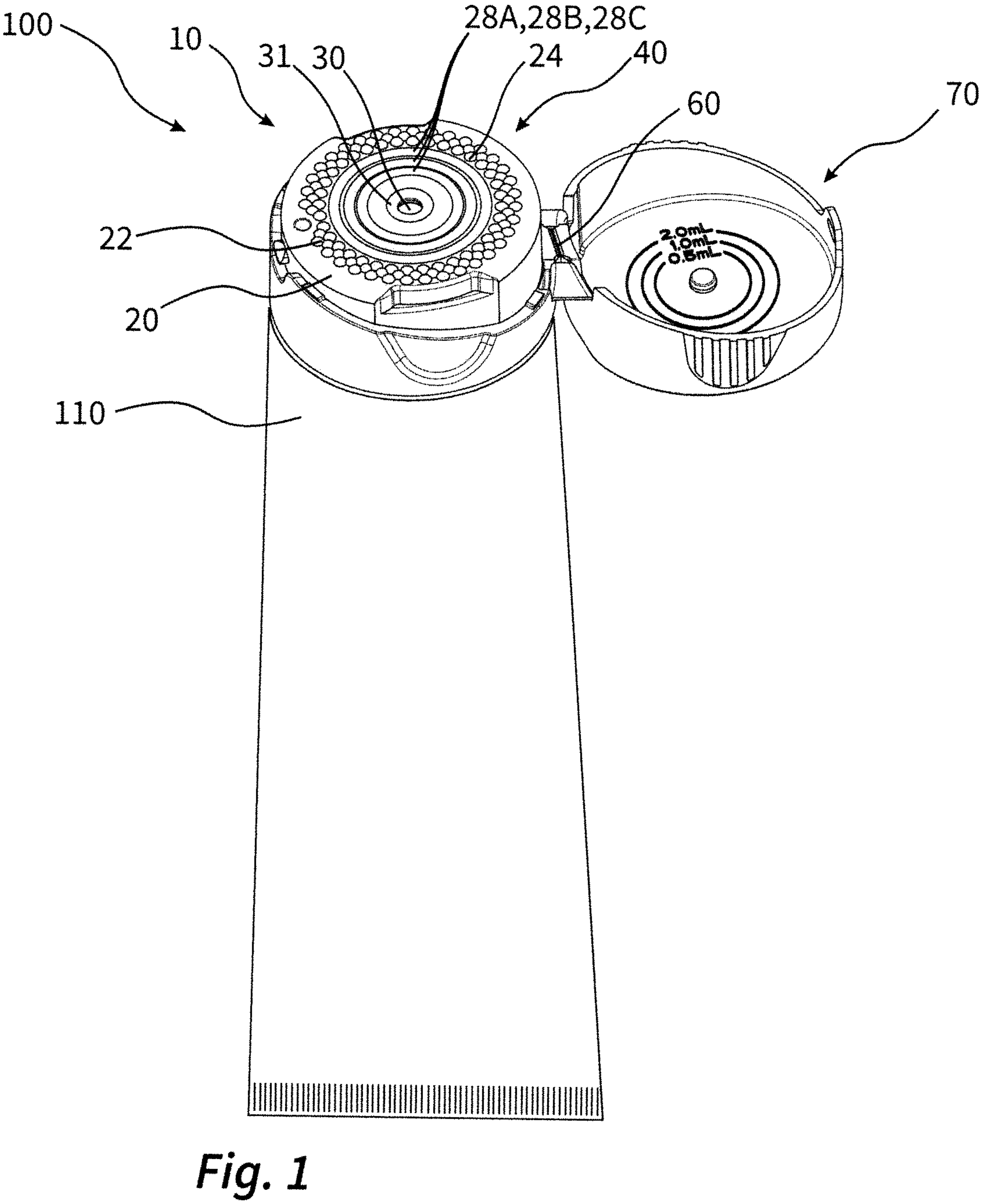
FIG. 1 shows a massage dispenser according to the invention in a perspective overall illustration.

FIG. 1 shows a massage dispenser 100 according to the invention. The latter has a massage applicator 10 and a fluid reservoir 110 in the form of a tube, to the outlet of which the massage applicator 10 is attached.

The massage applicator 10 has a base 40 as part of an outer component 12 and an inner component 14, not visible in FIG. 1. A hinged lid 70 is attached to the base 40 of the massage applicator 10 by means of a hinge 60, which lid is open in the state of FIG. 1.

The dispenser is a massage dispenser. The massage applicator 10 therefore has an end wall 20, on which a massage region 22 is provided, which has elevations 24, 28A, 28B, 28C, which make it possible to apply fluid previously present on the massage region 22 to the skin of the user and to massage it in there effectively. In order to place fluid on the massage region 22, an outlet channel 30 with an outlet 38, which outlet channgel 30 is connected to the fluid reservoir 110, is provided in the middle of the massage region 22. On the outlet side, the outlet channel 30 is surrounded by a sealing bead 31, which is designed so as to be raised to approximately the same extent as the massage elevations 24 with respect to the surrounding end wall 20.

When the tubular fluid reservoir 110 is compressed, fluid is discharged here for subsequent application.

Figure 2:
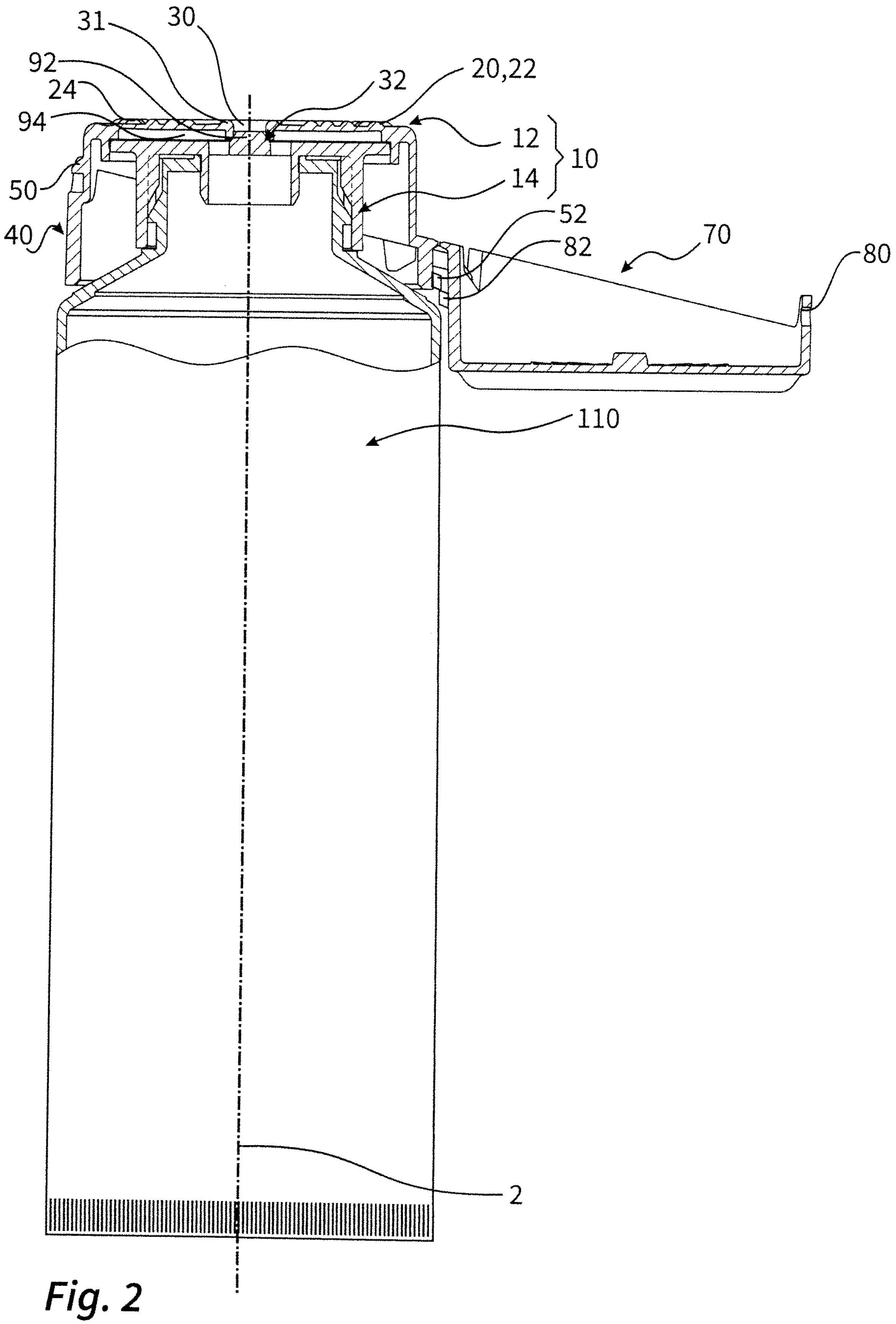
FIG. 2 shows the massage dispenser of FIG. 1 in a sectioned illustration.

FIG. 2 shows the massage dispenser 100 of FIG. 1 in a sectioned illustration. First of all, it can be seen here that the massage applicator 10 is assembled from the two components 12, 14 mentioned. Component 12 forms the outer component 12, which, in particular, forms the end wall 20 with the massage region 22 and the hinged lid 70 covering the massage region 22 in the closed state. The second component 14 is an inner component 14, which, on the one hand, serves to couple the fluid reservoir 110 and, on the other hand, is snapped into the outer component 12. In the middle of the inner component 14, an elevation acting as a valve body 92 is provided, which in a state of rest presses on an inlet 34 of the outlet channel 30 and thus closes the latter.

A valve chamber 94 is formed between the end wall 20 of the outer component 12 and the inner component 14, which is provided with passage channels. If, as a result of pressure on the fluid reservoir 110, the pressure in the valve chamber 94 is also increased, indirectly, through apertures in the inner component 14, this leads to the end wall 20 with the massage region 22 being lifted upward, with the result that an outlet valve 32 formed by the outlet channel 30 and the valve body 92 is opened and the fluid can emerge onto the massage region 22. If the pressure on the fluid reservoir 110 is eliminated, the outlet valve 32 closes again.

FIGS. 3 to 5B illustrate particular aspects according to the invention of the massage dispenser 100 and its massage applicator 10.

Figure 3:
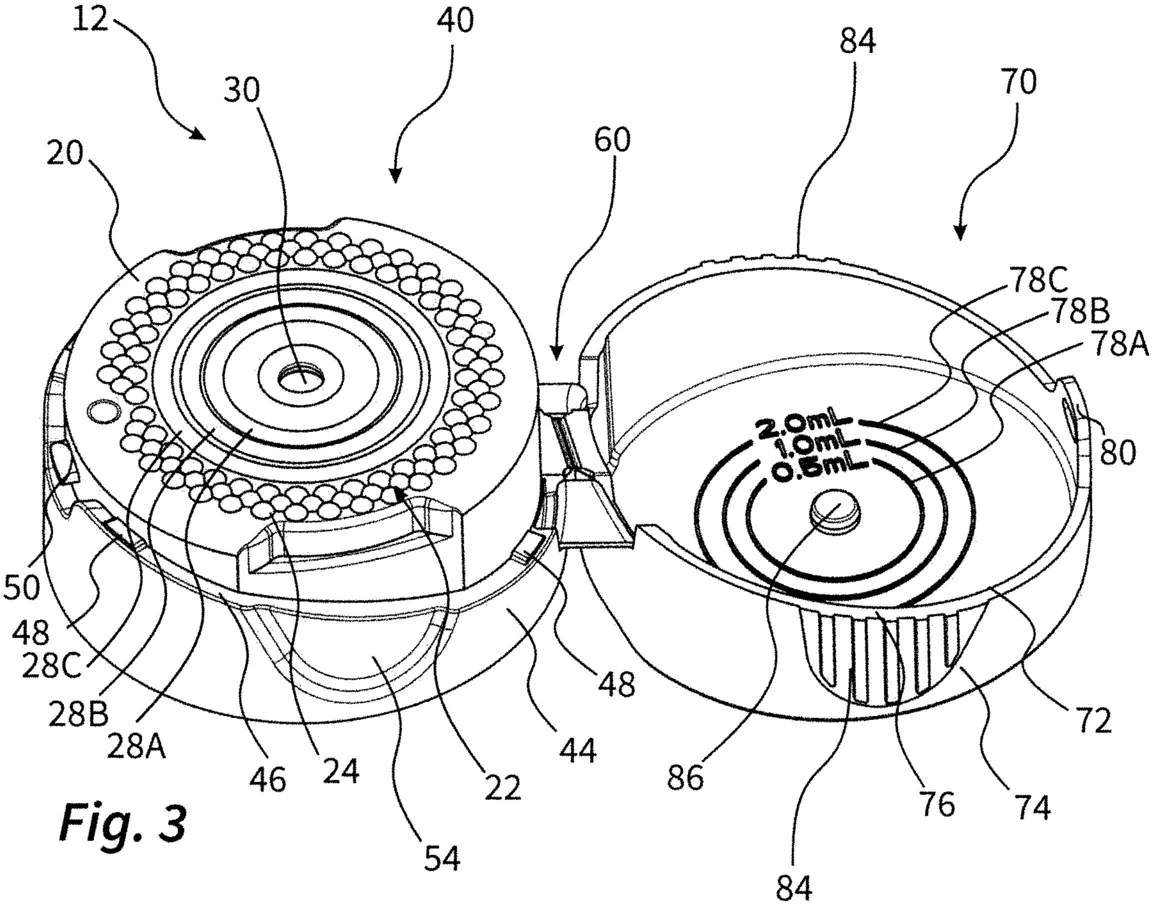
FIG. 3 shows the massage applicator of the massage dispenser in a separate illustration.

In FIG. 3, the outer component 12 of the massage applicator 10 is shown in an enlarged representation. As already described above, the massage region 22 is provided on the end wall 20 of the base 40, which end wall can be deformed comparatively easily for the purpose of valve opening. The elevations provided in this massage region 22 serve various purposes. While all the elevations 24, 28A, 28B, 28C serve the purpose of enabling the fluid to be massaged into the skin, the annular elevations 28A, 28B, 28C have a significance which goes beyond this. These elevations form markings which facilitate the discharge of a defined quantity of fluid. As can be seen on the right-hand side in FIG. 3, an inscription 78A, 78B, 78C is provided on the inner side of the hinged lid 70. This comprises three concentric circles, which are each assigned to one of the raised rings 28A, 28B, 28C in the massage region 22 and which are each provided with a volume value. It can be seen from this that a volume of 0.5 ml is achieved during the discharge of fluid when the fluid reaches the innermost raised ring 28A during discharge. If additional fluid is discharged, it will overflow ring 28A and initially extend as far as ring 28B. The user then knows that he has discharged about 1 ml of the fluid in accordance with inscription 78B. If still more fluid is required, the user can discharge further fluid until it reaches the last raised ring 28C. In accordance with inscription 78C, a quantity of fluid of approximately 2 ml has then been discharged.

The diameter which the annular elevations 28A, 28B, 28C must have in order to be able to receive the respectively assigned volume on the inside also depends on the fluid to be discharged and its viscosity. The diameters of the annular elevations 28A, 28B, 28C are therefore preferably adapted to suit the fluid contained in the fluid reservoir 110.

Figure 3A:
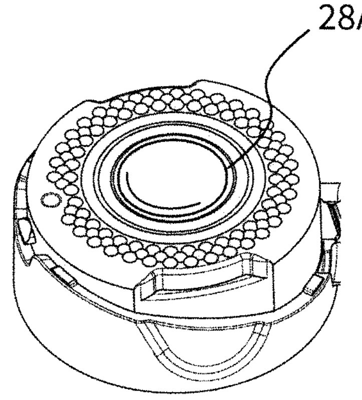
FIGS. 3A to 3C show the massage applicator when discharging different quantities of fluid.
Figure 3B:
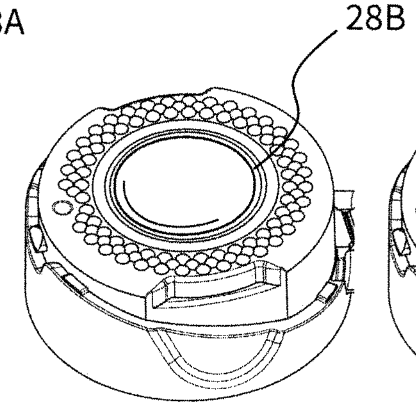
Figure 3C:
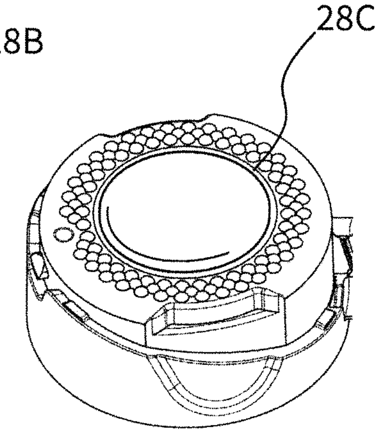

FIGS. 3A to 3C illustrate the distribution of a fluid volume of 0.5 ml, 1.0 ml and 2.0 ml.

The annular markings 28A to 28C thus allow the user to discharge in a simple manner the quantity of fluid desired by him and possibly prescribed by a doctor, without a complex metering mechanism, for example by means of a pump, being required for this purpose. In addition, the markings 28A, 28B, 28C as elevations are also expedient when massaging in the fluid.

The other elevations 24, which are designed in the form of smaller round elevations, serve exclusively for the massaging effect.

Figure 4A:
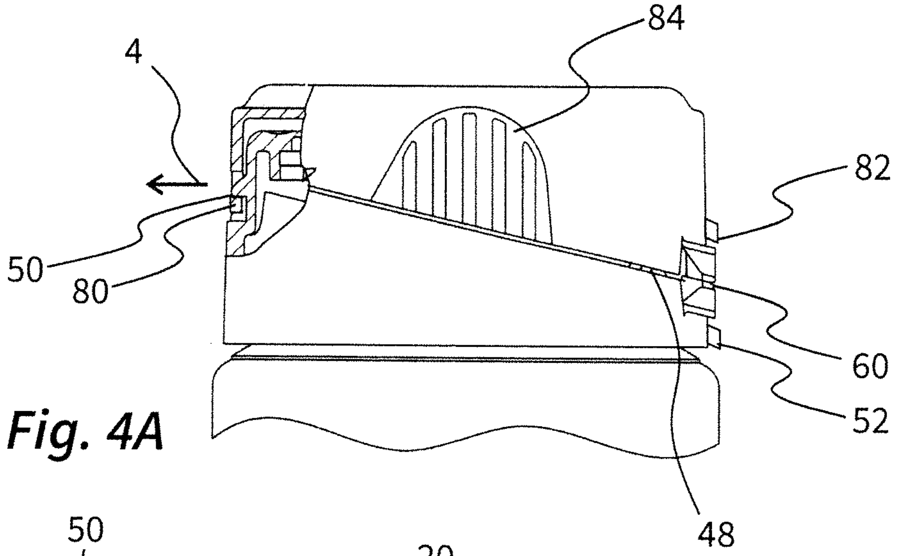
FIGS. 4A and 4B show the massage applicator in a sectioned illustration and in the closed and opened state.
Figure 4B:
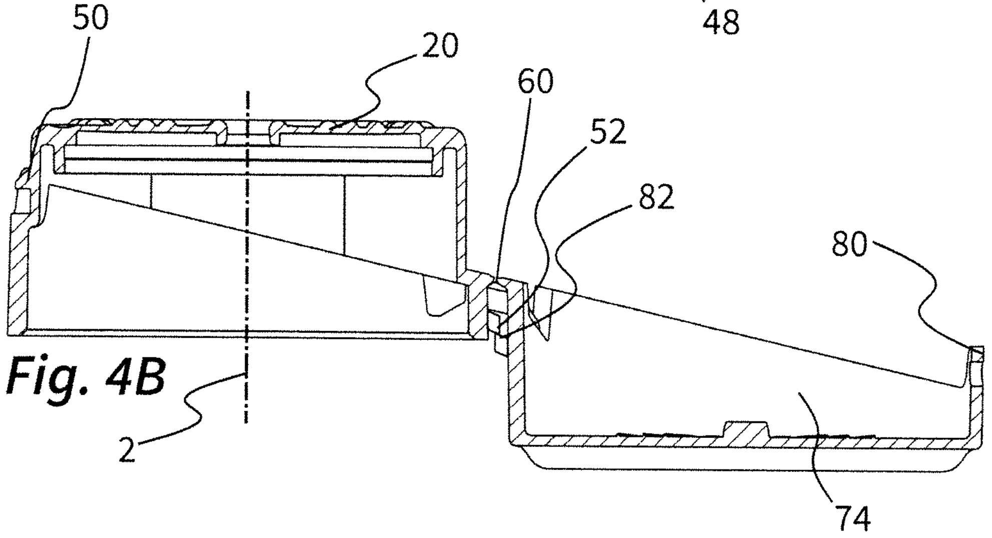

FIGS. 4A and 4B show the outer component 12 of the massage applicator in a sectioned illustration. It can be seen that, in the closed state of FIG. 4A, a locking element 50 in the form of a pin on the base engages in a locking element 80 in the form of an eye on the lid, so that the hinged lid 70 cannot simply be swung open from the state secured in this way. In order to be able to swing open the hinged lid 70, the user must simultaneously press in release surfaces 84 shown in FIG. 3 on opposite sides of a lateral surface 74 of the hinged lid 70. This leads to oval deformation of the lateral surface 74 of the hinged lid 70 and therefore causes displacement of the locking element 80 on the lid in the direction of the arrow 4. Only when the locking elements 50, 80 have been disengaged from one another is it possible to swing open the lid. In this case, the required force which must act on the release surfaces 84 is dimensioned in such a way that it cannot be applied by an infant, especially since it is already difficult for a child to reach both release surfaces 84 simultaneously with only one hand and then to actuate them as a result of a spacing of the release surfaces 84 by approximately 4 cm.

In order to prevent friction in the region of outer end faces 46, 76 or cream residues remaining here from making opening difficult even for adults, a plurality of crenellated elevations 48 are provided on the side of the outer end face 46 of the base, which crenellated elevations come into contact with the outer end face 76 of the hinged lid. This has the effect that the force to be applied by an adult on the release surfaces 84 remains reproducible even in the case of the said cream residues.

In order to facilitate actuation for an adult, depressions 54 are furthermore provided on a lateral surface 44 of the base 40, which lateral surface is in alignment with lateral surface 74. These facilitate forceful compression of the release surfaces 84.

Referring again to FIGS. 4A and 4B, it can be seen that respective latching elements with latching edges 82, 52 are provided in the region of the hinge 60 on the hinged lid 70 and the base 40. In the closed state of FIG. 4A, these latching edges 52, 82 are clearly spaced apart from one another. However, if the hinged lid 70 is now folded over after the locking elements 50, 80 have been unlocked, these latching edges 82, 52 come into contact with one another and snap into the state shown in FIG. 4B after slight elastic deformation. Thus, effective securing of the hinged lid 70 in the swung-open state is achieved, this being advantageous, in particular, because the hinged lid 70 fixed in this way and its locking element 80 usually cannot come into contact with the skin during the application of the fluid to the skin. If the hinged lid 70 is closed again by pivoting it back, a slight elastic deformation of said latching edges 52, 82 occurs again before they separate from one another and make it possible for the hinged lid 70 to be shut.

From FIG. 4B, it can furthermore also be seen that the hinged lid 70 has a special shape, with the base 40 being configured to correspond thereto. The special shape consists in that, with respect to a central axis 2, the locking element 80 and the hinge 60 are offset with respect to one another. This makes it possible to place the comparatively sharp-edged locking element 80 far from the plane of the end wall 20 for the purpose of applying the fluid, in order to reduce the risk of contact between the skin and the locking element 80. The offset arrangement of the hinge 60 and the locking element 80 also enables elegant shaping of the lateral surface 74, which, as can be clearly seen in FIG. 4B, is designed to taper toward the locking element 80 in a lateral perspective. This also reduces the risk of contact between the hinged lid 70 and the skin. In addition, the lateral surface 74 in this way offers sufficient space for the already mentioned release surfaces 84.

Figure 5A:
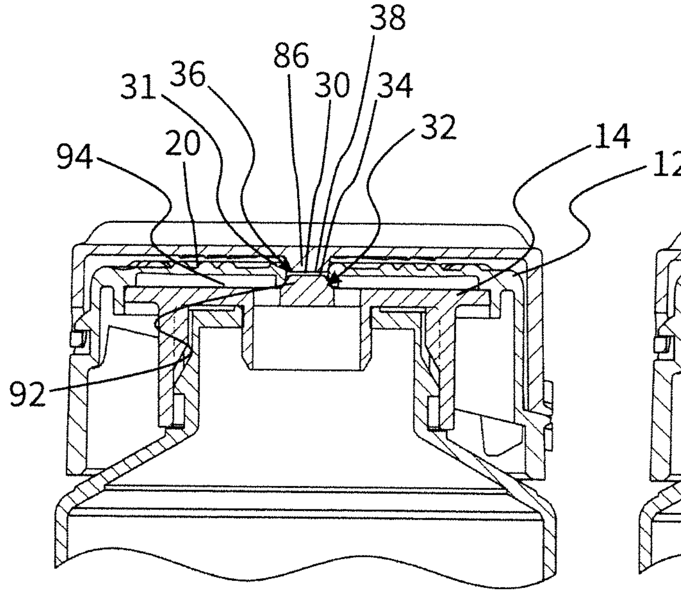
FIGS. 5A and 5B show the closed massage applicator in a sectioned illustration in the state of rest and in the event of pressurization of the fluid in the fluid reservoir.
Figure 5B:
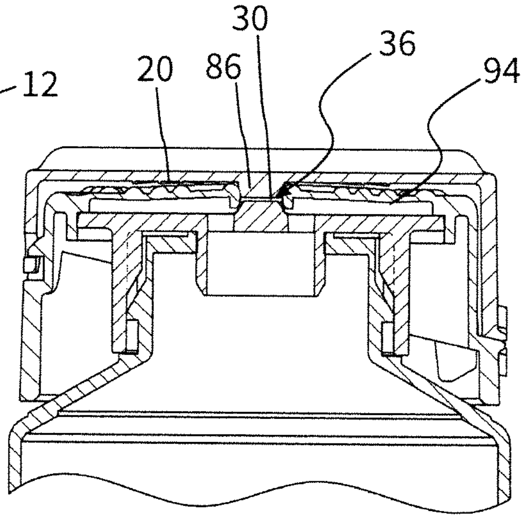

FIGS. 5A and 5B illustrate the mode of operation of the outlet valve 32 in interaction with a blocking valve 36. The outlet valve 32 has already been described above. It is formed by the valve body 92 on the inner component 14, on the one hand, and the inlet into the outlet channel 30, on the other hand. When the pressure in the valve chamber 94 rises as a result of actuation of the dispenser, the end wall 20 rises and allows fluid to escape from the valve chamber 94 in the direction of the massage region 22. In the closed state of the dispenser, this is not intended. If, in the closed state of the dispenser, an excess pressure is inadvertently built up in the fluid reservoir 110, as far as possible no fluid should reach the massage region 22.

In order to achieve this, a valve body 86 is also provided on the inner side of an end face 72 of the hinged lid 70 and, in the closed state, this valve body is arranged predominantly above the outlet channel 30 and projects into the latter. The valve body 86 has a tapering and preferably, at least in some section or sections, a conical shape, enabling it to reliably enter the outlet channel 30 when the hinged lid 70 closes.

If, in the closed state, there is now an increase in pressure in the valve chamber 94 and thus a deflection of the end wall 20, as illustrated in FIG. 5B, the blocking valve 36 formed by the valve body 86 and the outlet channel 30 and its sealing bead 31 closes. Accordingly, only a small quantity of fluid, if any, can escape into the massage region 22.

In the configuration according to FIGS. 5A and 5B, the outlet valve 32 and the blocking valve 36 are not simultaneously securely closed. The blocking valve 36 is closed only by a deflection of the end wall 20 as a result of an increase in pressure. In alternative configurations, however, provision can also be made for the preferably slightly conical valve body 86 to already press against the end wall 20 from above in the case of the closed hinged lid 70, thus ensuring that the end wall is clamped between the valve bodies 86, 92. The prestress then present in the end face 72 of the hinged lid 70 leads to particularly secure closing of the two valves 32, 36. However, such a construction is not only advantageous, since the continuous clamping of the end wall 20 and the repeated withdrawal of the valve body 86 from the outlet channel 30 could damage the easily deformable end wall 20. Therefore, the design with a blocking valve which is not continuously closed in the closed state also has its raison d'être.

Figure 6:
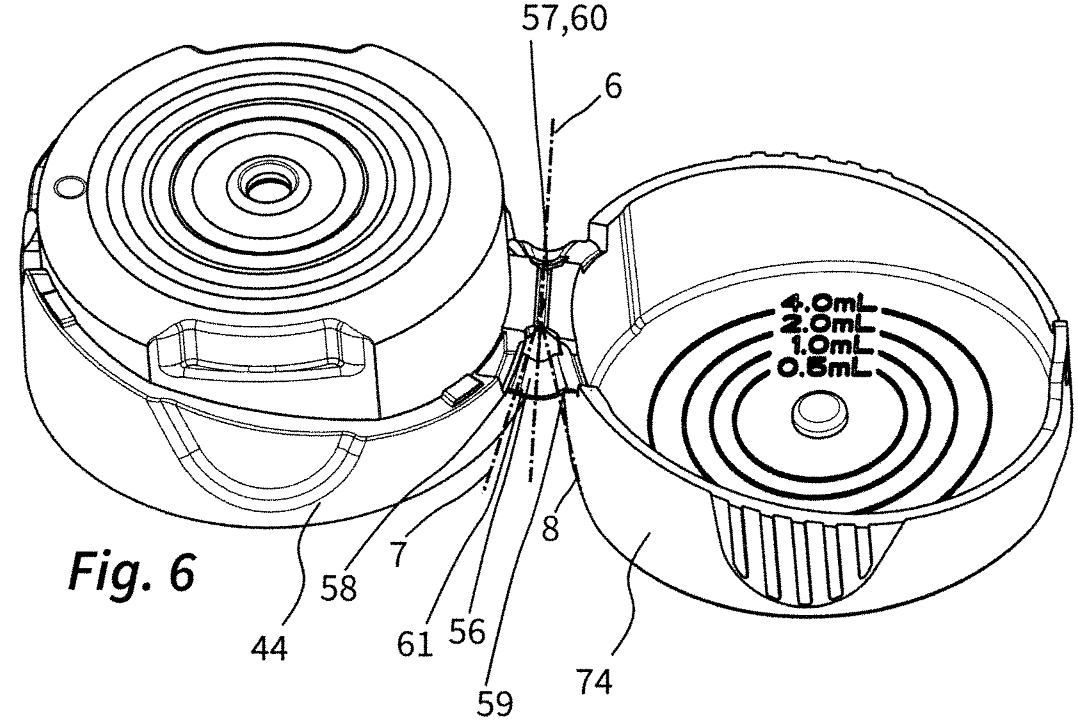
FIGS. 6, 6A and 7 show a second variant of a massage applicator, which is distinguished, in particular, by a different design of the hinge device.
Figure 6A:
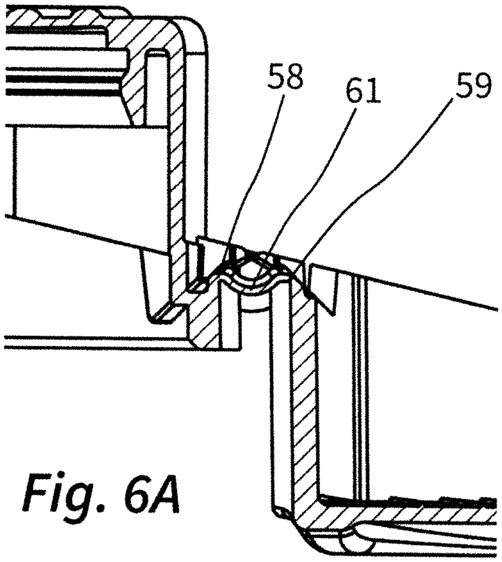
Figure 7:
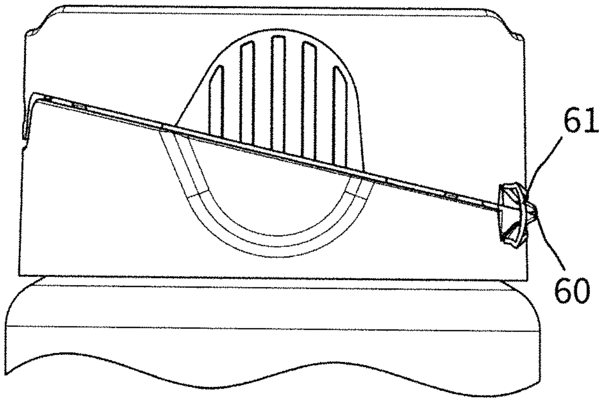

FIGS. 6, 6A and 7 show a variant of the massage head which differs from the preceding one, particularly with regard to the hinge device 55. In accordance with the first variant, a film hinge 60 is also provided here, by means of which the base 40 and the hinged lid 70 are directly connected to one another and can be pivoted relative to one another about a bending axis 6. The film hinge 60 thus forms a central connecting bridge 57. Two further connecting bridges 56 are provided symmetrically to the side thereof. These also connect the hinged lid 70 and the base 40, but are longer than the central connecting bridge 57 formed only by the film hinge 60.

The lateral connecting bridges 56 project approximately orthogonally from the respective lateral surfaces 44, 74 of the base 40 and of the hinged lid 70 with attachment regions 58, 59. The attachment regions 58, 59 on both sides are connected to one another via a central part 61 which, in the production state of FIGS. 6 and 6A, forms a downwardly curved and upwardly open bent shape, the inner radius of which is approximately 2 to 3 mm. The transitions between the attachment regions 58, 59 and the central part 61 form bending axes 7, 8. FIG. 6A shows this again in a sectioned illustration.

If the lid is closed, the connecting bridge 56 bends in the region of the bending axes 7, 8. Due to the position of the bending axis 6 of the central connecting bridge 57, the central part 61 is stretched during closing. This is accomplished by a bending deformation of the central part 61 designed as a bent shape, which slightly increases its radius of curvature in the process.

The increase in the radius of curvature in the bending regions forming the central part 61 takes place completely elastically, and the resulting elongation is therefore not permanent. Such a permanent elongation would have to be feared if the central part were designed to be flat, resulting in pure elongation of the central part 61. Such elongation would partially entail plastic deformation and would have the result that the swung-open hinged lid 70 would no longer remain stably in the desired position, pivoted through 180°, but would pivot through a smaller angle, so that there would then be the risk of injury to the skin during the massage.

Figure 8:
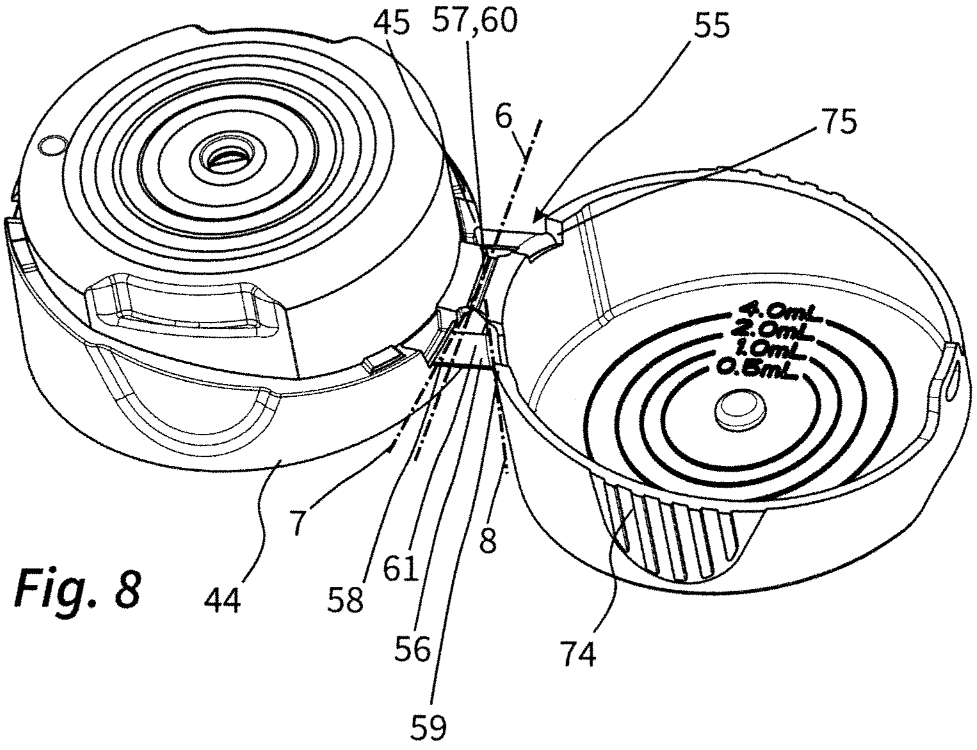
FIGS. 8 and 8A show a third variant, which shows a further modified design of the hinge device.
Figure 8A:
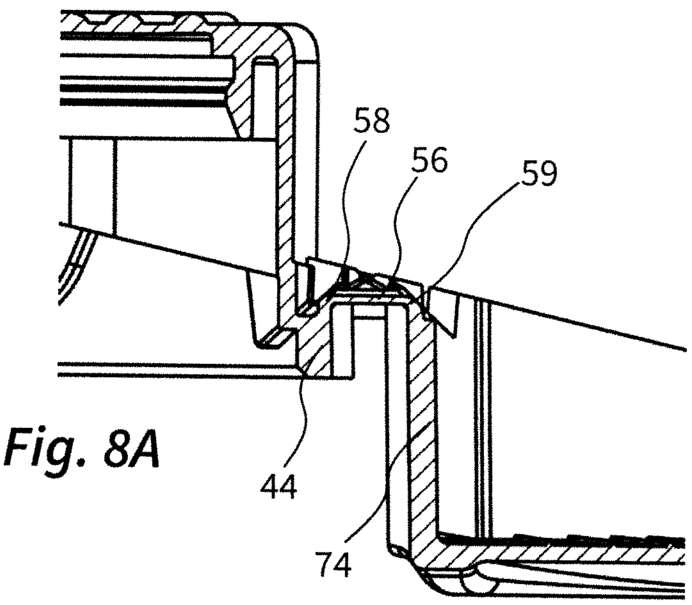

In the configuration of FIGS. 8 and 8A, the two outer connecting bridges 56 are configured differently. In the production state illustrated, they are largely flat. As in the case of the configuration of FIGS. 6 and 7, the lateral connecting bridges 56 do not have a bending axis which coincides with the bending axis 6 of the film hinge 60 but are designed primarily to buckle in attachment regions 58, 59, with the result that these regions form the respective bending axes 7, 8.

The attachment regions 58, 59 are designed as bending regions 58, 59, in which, in the production state of FIG. 8, the connecting bridges 56 are bent over continuously with an inner bending radius of approximately 1 mm, that is to say, without a sharp edge, they make a transition from a direction of the lateral walls 44, 74 which is vertical with respect to FIGS. 8 and 8A into the horizontal central section 61 of the connecting bridges 56.

If the hinged lid 70 is closed in order to produce the closed state of FIG. 7, this movement takes place about the bending axis 6 and, as described above with respect to FIGS. 6 and 7, requires an elongation of the connecting bridge 56 at least temporarily. This elongation is achieved primarily in the bending regions 58, 59, at which the bending radius is temporarily reduced somewhat. In order to permit this increased bending, the bending regions 58, 59 are separated from the adjacent lateral walls 44, 74 of the base 40 and of the hinged lid 70 by respective release cuts 45, 55/75 on both sides.

Here too, the increased bending in the bending regions 58, 59 takes place completely elastically, and the resulting elongation is therefore not permanent.

In the case of the design of FIGS. 6 and 7 too, the configuration of the bending regions can also alternatively be identical to that of FIG. 8, that is to say with connecting bridges 56 which emanate in an aligned manner from the lateral walls 44, 74 and are separated from the adjacent lateral wall by release cuts.

The invention claimed is:

1. A device for massaging in and dispensing cream-type fluids, the device comprising massage applicator having an end wall with a massage region, massage elevations provided on the massage region, the end wall being penetrated by at least one outlet channel for dispensing the cream-type fluid, the massage applicator having a base, of the end wall with the massage region and the outlet channel being provided on the base, the massage applicator having has a hinged lid configured to be pivotable via a hinge provided at a side of the massage region, the hinged lid being pivotable between a closed state, the hinged lid in the closed state covering the massage region, and an opened state, the hinged lid in the opened state exposing the massage region, and the massage applicator having at least one latching edge provided on the hinged lid and on the base, respectively, the latching edges being arranged such that, when the hinged lid is opened, the latching edges come into contact with one another and, when an opening movement of the hinged lid is continued, snap together or jam together such that the hinged lid is locked in the opened state.

2. The device as claimed in claim 1, wherein the hinged lid is pivotable through at least 150°, between the closed state and the opened state.

3. The device as claimed in claim 1, further comprising a fluid reservoir for storing the cream-type fluid before discharge from the outlet channel, the massage applicator being connected to the fluid reservoir.

4. A device for massaging in and dispensing cream-type fluids, the device comprising a massage applicator having an end wall with a massage region, massage elevations provided on the end wall, the end wall being penetrated by at least one outlet channel for dispensing the cream-type fluid, the massage applicator having a base, the end wall with the massage region and the outlet channel being is provided on the base, and the massage applicator having a hinged lid configured to be pivotable via a hinge device provided at a side of the massage region, the hinged lid being pivotable between a closed state, the hinged lid in the closed state covering the massage region, and an opened state, the hinged lid in the opened state exposing the massage region, the hinge device having at least two connecting bridges between the base and the hinged lid, wherein a first connecting bridge of the at least two connecting bridges is articulated such that the first connecting bridge is pivotable about different bending axes on a side of the base and on a side of the hinged lid, and the bending axes of the first connecting bridge are not aligned coaxially with a bending axis of a second connecting bridge of the at least two connecting bridges, such that, depending on an opening angle, the hinged lid is subjected to force in a direction of the closed state or a pivoted end position, and the first connecting bridge has a bent shape permitting elastic elongation of the first connecting bridge by at least 10% without plastic deformation of the first connecting bridge.

5. The device as claimed in claim 4, comprising at least one of the following:

at least one end of the first connecting bridge makes a transition in a connecting region, starting from a bend in the first connecting bridge, in an aligned manner into a lateral wall of the base and/or of the hinged lid, wherein mechanical decoupling is produced by at least one lateral release cut in the connecting region between the connecting bridge and sections of the lateral wall which are adjacent in the circumferential direction;

the bent shape of the first connecting bridge comprises, at opposite ends, bending sections with an inner radius of curvature of at least 0.3 mm, by which the first connecting bridge makes a transition in an aligned manner into a lateral wall of the base and/or of the hinged lid;

a plurality of connecting bridges is provided in the manner of the first connecting bridge, and are arranged on both sides with respect to the second connecting bridge; and the second connecting bridge is formed by a hinge arranged in a stationary manner both with respect to the base and with respect to the hinged lid.

6. The device as claimed in claim 4, further comprising a fluid reservoir for storing the cream-type fluid before discharge from the outlet channel, the massage applicator being connected to the fluid reservoir.

7. A device for massaging in and dispensing cream-type fluids, the device comprising a massage applicator having an end wall with a massage region, massage elevations provided on the massage region, the end wall being penetrated by at least one outlet channel for dispensing the cream-type fluid, the massage applicator having a base, the end wall with the outlet channel being provided on the base, the massage applicator having a hinged lid configured to be pivotable via a hinge provided at side of the massage region between a closed state, the hinged lid in the closed state covering the massage region, and an open state, the hinged lid in the open state exposing the massage region, and a child safety mechanism for fixing the hinged lid in the closed state, the child safety mechanism having, on the base and on the hinged lid, locking elements engaged with one another in a locking position to prevent the hinged lid from being swung open, and the child safety mechanism has at least two release surfaces for manual actuation, the at least two release surfaces being spaced apart from one another and operatively connected to one of the locking elements such that an application of force to both of the release surfaces takes place simultaneously with a displacement of the locking elements relative to one another, thereby enabling the hinged lid to be swung open.

8. The device as claimed in claim 7, wherein the hinged lid has a lateral surface, on which lateral surface the locking element of the hinged lid and the hinge are provided opposite one another, and the hinge is spaced apart from the massage region by at least 5 mm relative to a central axis of the massage applicator.

9. The device as claimed in claim 7, wherein the hinged lid and the base each have a lateral surface, the lateral surfaces being designed to be in alignment with one another, at least in a partial region, and adjacent to the release surfaces on the lateral surface of the hinged lid, depressions are provided in the lateral surface of the base, in the region of which depressions the lateral surface of the base is set back or interrupted with respect to the lateral surface of the hinged lid.

10. The device as claimed in claim 7, wherein the hinged lid and the base each have a lateral surface, the lateral surfaces being designed to be in alignment with one another, at least in a partial region, the lateral surfaces merge in at least one partial region into outer end faces that face one another, wherein a distance of between 0.1 mm and 0.5 mm remains between the outer end faces in a predominant part of the outer end faces, and elevations are provided at least on one outer end face, in the region of which elevations the outer end faces rest against one another.

11. The device as claimed in claim 7, further comprising a fluid reservoir for storing the cream-type fluid before discharge from the outlet channel, the massage applicator being connected to the fluid reservoir.

12. A device for massaging in and dispensing cream-type fluids, the device comprising a massage applicator having an end wall with a massage region, massage elevations provided on the massage region, the end wall being penetrated by at least one outlet channel for dispensing the cream-type fluid, the massage applicator having a base, the end wall with the outlet channel being is provided on the base, the massage applicator having a hinged lid configured for pivoting via a hinge provided at a side of the massage region between a closed state, the hinged lid in the closed state covering the massage region, and an opened state, the hinged lid in the opened state exposing the massage region, the massage applicator having an outlet valve formed by a first valve pin, arranged on an inside of the outlet channel, an inlet into the outlet channel and openable via an excess pressure in a valve chamber below the end wall, wherein the excess pressure lifts the end wall relative to the first valve pin, and a second valve pin provided on the hinged lid in a region of the outlet channel, the second valve pin, together with an outlet of the outlet channel, forming a blocking valve, the blocking valve closing when the hinged lid is closed, at least when the end wall is lifted relative to the first valve pin by excess pressure.

13. The device as claimed in claim 12, wherein the outlet valve and the blocking valve are configured such that, when the hinged lid is closed and there is no excess pressure in the valve chamber, the outlet valve and the blocking valve clamp the end wall therebetween.

14. The device as claimed in claim 12, wherein the second valve pin has a shape tapering in a direction of the outlet channel, and the second valve pin has, at a distal end, a cross-sectional area which is smaller than an outlet-side opening of the outlet channel, such that a distal end of the second valve pin is arranged in the outlet channel when the hinged lid is closed.

15. The device as claimed in claim 12, wherein the outlet channel has an outlet-side opening surrounded by a raised sealing bead.

16. The device as claimed in claim 12, wherein opening of the outlet valve takes place primarily by elastic deformation of the end wall.

17. The device as claimed in claim 12, wherein the hinged lid comprises polypropylene.

18. The device as claimed in claim 12, further comprising a fluid reservoir for storing the cream-type fluid before discharge from the outlet channel, the massage applicator being connected to the fluid reservoir.

* * * * *